United States Patent
Okada et al.

(10) Patent No.: US 7,233,414 B2
(45) Date of Patent: Jun. 19, 2007

(54) IMAGE RECORDING APPARATUS AND METHOD, IMAGE REPRODUCING APPARATUS AND METHOD, AND RECORDING MEDIUM ON WHICH IMAGE PROCESSING PROGRAM IS RECORDED

(75) Inventors: Sadami Okada, Sakado (JP); Satoshi Ejima, Tokyo (JP); Ken Utagawa, Yokohama (JP); Hideaki Matsuda, Tokyo (JP); Kenichi Ishiga, Kawasaki (JP)

(73) Assignee: Nikon Corporation, Tokyo (JP)

( * ) Notice: Subject to any disclaimer, the term of this patent is extended or adjusted under 35 U.S.C. 154(b) by 827 days.

(21) Appl. No.: 09/761,623

(22) Filed: Jan. 17, 2001

(65) Prior Publication Data

US 2001/0008449 A1 Jul. 19, 2001

(30) Foreign Application Priority Data

Jan. 18, 2000 (JP) ............................. 2000-009371

(51) Int. Cl.
  *H04N 1/40* (2006.01)
  *G06K 15/00* (2006.01)

(52) U.S. Cl. ....................... 358/3.01; 358/358; 358/3.1; 358/3.27

(58) Field of Classification Search ................. 358/1.9, 358/521, 523–525, 518, 3.1, 3.01, 464, 471; 382/251, 232, 233, 235
See application file for complete search history.

(56) References Cited

U.S. PATENT DOCUMENTS

| | | | |
|---|---|---|---|
| 4,926,268 A * | 5/1990 | Kawamura et al. .......... 358/3.1 |
| 5,414,527 A | 5/1995 | Koshi et al. |
| 5,528,293 A | 6/1996 | Watanabe |
| 5,537,496 A * | 7/1996 | Katayama ................... 382/272 |
| 5,754,683 A * | 5/1998 | Hayashi et al. ............. 382/167 |
| 5,930,007 A * | 7/1999 | Kojima ........................ 358/464 |
| 6,038,369 A * | 3/2000 | Imai ............................. 386/95 |

(Continued)

FOREIGN PATENT DOCUMENTS

EP 0580146 A1 1/1994

(Continued)

OTHER PUBLICATIONS

"Sams Teach Yourself Llnux in 24 Hours", by Bill Ball and Stephen Smoogen, copyright 1998, Sams Publishing and Red Hat Press, pp. 56-59 and pp. 77-80.*

*Primary Examiner*—David Moore
*Assistant Examiner*—James A. Thompson
(74) *Attorney, Agent, or Firm*—Oliff & Berridge PLC

(57) ABSTRACT

The present invention is intended to record image data having a wide dynamic range is a file together with image data having a narrow dynamic range. First, an image recording apparatus separately gradation-converts image data to be recorded into primary data having a narrow dynamic range and secondary data having a wide dynamic range. Then, the image recording apparatus calculates data that determines correlation between the primary data and secondary data and employs the calculated data as tertiary data. The image recording apparatus records the primary data and the tertiary data in a file. On the other hand, an image reproducing apparatus reads out primary data and tertiary data that were recorded in the above manner and reproduces secondary data having a wide dynamic range based on the primary data and the tertiary data.

27 Claims, 8 Drawing Sheets

U.S. PATENT DOCUMENTS

| | | | |
|---|---|---|---|
| 6,057,946 A * | 5/2000 | Ikeda et al. | 358/518 |
| 6,147,771 A * | 11/2000 | Washio | 358/1.9 |
| 6,240,217 B1 * | 5/2001 | Ercan et al. | 382/274 |
| 6,301,393 B1 | 10/2001 | Spaulding et al. | |
| 6,542,260 B1 * | 4/2003 | Gann et al. | 358/471 |

FOREIGN PATENT DOCUMENTS

| | | |
|---|---|---|
| EP | 0583107 A2 | 2/1994 |
| EP | 1035728 B1 | 9/2000 |
| GB | 2330972 A | 5/1999 |
| JP | 7-274108 | 10/1995 |
| JP | 11-275413 | 10/1999 |
| JP | 2000-236509 | 8/2000 |
| WO | WO 99/10838 | 3/1999 |
| WO | WO 99/30483 | 6/1999 |
| WO | WO 99/55013 | 10/1999 |

* cited by examiner

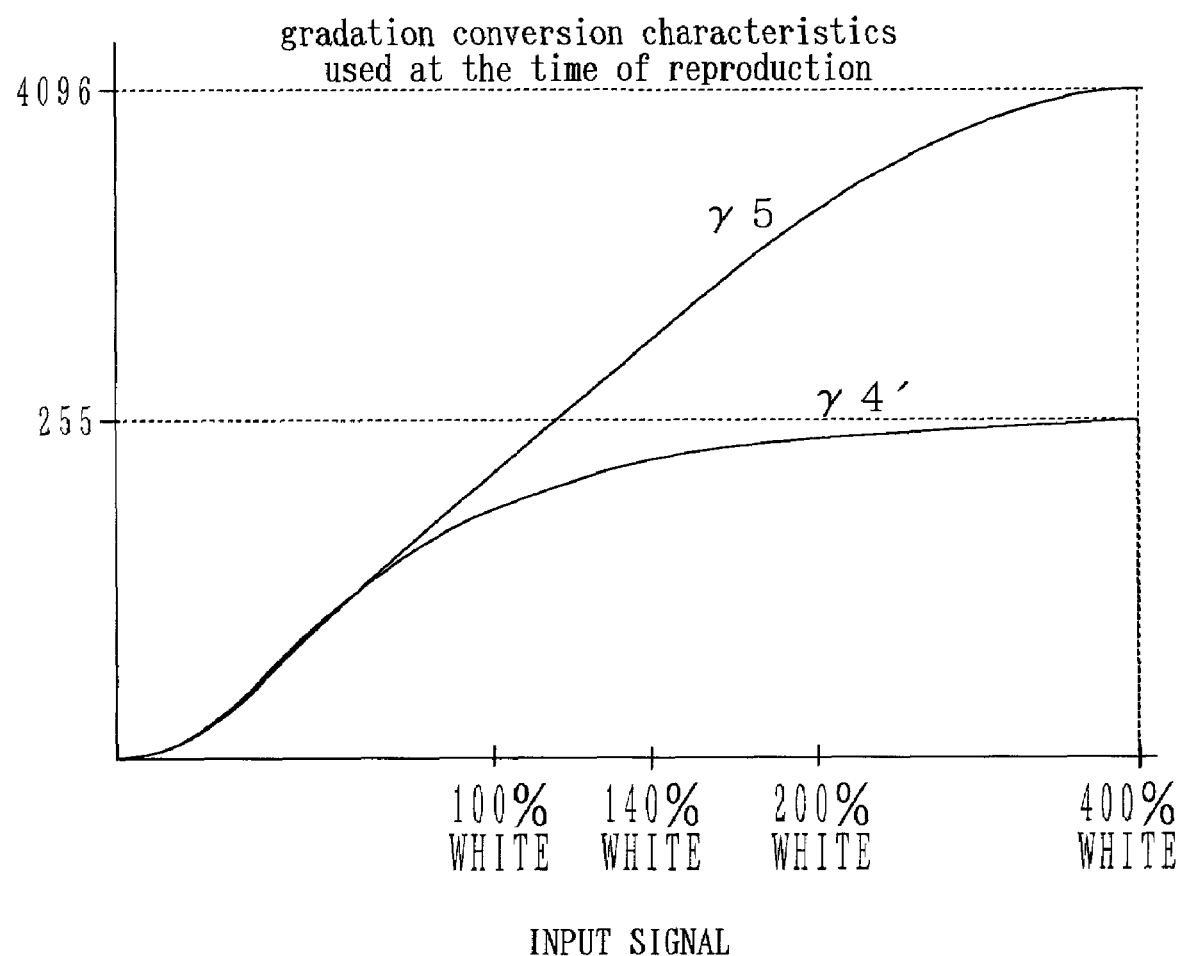

IMAGE RECORDING APPARATUS AND METHOD, IMAGE REPRODUCING APPARATUS AND METHOD, AND RECORDING MEDIUM ON WHICH IMAGE PROCESSING PROGRAM IS RECORDED

CROSS REFERENCE TO RELATED APPLICATION

The disclosure of the following priority application is herein incorporated by reference: Japanese Patent Application No. 2000-009371, filed Jan. 18, 2000.

BACKGROUND OF THE INVENTION

1. Field of the Invention

The present invention relates to an image recording apparatus and method for recording image data as well as to a recording medium on which an image processing program for realizing the above image recording apparatus on a computer is recorded. The invention also relates to an image reproducing apparatus and method for reproducing a file generated by the above image recording apparatus as well as to a recording medium on which an image processing program for realizing the above image reproducing apparatus on a computer is recorded.

2. Description of the Related Art

In image recording apparatuses, usually, 8-bit-gradation (24 bits total in the case of 3-color data) image data are compressed and recorded in the form of a general-purpose compressed image file. Capable of being expanded by a general-purpose image-browsing program, such a general-purpose compressed image file has an advantage that it can be printed or displayed easily without using any dedicated software.

In recent years, there have been developed image recording apparatuses such as a digital still camera that can record raw data (i.e., data obtained by merely digitizing an output of an imaging device).

Raw data are image data that are faithful to an output of an imaging device and include fine gradation components (gradation signals). Therefore, raw data have an advantage that they are not easily impaired by complex data processing for designing, printing, and like purposes and their subtle gradation signals are not easily lost.

Incidentally, a general-purpose compressed image file of about 8-bit gradations as mentioned above has a relatively narrow gradation reproduction (tone reproduction) range and allows a high-luminance-side portion of an object to be reproduced with a gradation reproduction range of 140% white at most. Such a general-purpose compressed image file has a problem that high-luminance-side/low-luminance-side gradation components cannot be reproduced affluently with sufficient performance. It is desired that a general-purpose compressed image file have a gradation reproduction range of up to 200% white, and if possible, 400% white.

A general-purpose compressed image file is expressed with 8-bit gradations. This results in a problem that discontinuity of gradations becomes conspicuous when a file is subjected to image processing such as a contrast conversion.

On the other hand, raw data as mentioned above have a large number of quantization bits and hence allow fine middle range signals to be reproduced affluently with sufficient performance. However, raw data are given gradation characteristics and a data format that are specific to hardware such as a digital still camera. In standard form, general-purpose external apparatuses such as a printer and a monitor cannot deal with such raw data. That is, raw data are associated with a problem that it requires dedicated image processing and cannot be printed or displayed easily by a general-purpose external apparatus.

Image data such as raw data having a large number of quantization bits include fine middle range signals affluently. The degree of spatial redundancy of raw data is extremely lower than 8-bit-gradation image data. This results in a problem that conventional image compression methods that eliminate spatial redundancy cannot compress raw data into a file of a small size.

SUMMARY OF THE INVENTION

In view of the above, an object of the invention is to provide an image recording apparatus and method capable of efficiently recording image data having a wide gradation reproduction range.

Another object of the invention is to provide a recording medium on which an image processing program for allowing a computer to function as the above image recording apparatus is recorded.

Still another object of the invention is to provide an image reproducing apparatus and method for reproducing image data that were recorded by the above image recording apparatus.

A further object of the invention is to provide a recording medium on which an image processing program for allowing a computer to function as the above image reproducing apparatus is recorded.

The invention provides an image recording apparatus comprising a first converting unit for converting image data into primary data having an N-bit range according to a first gradation conversion (tone conversion) characteristic; a second converting unit for converting the image data into secondary data having an M-bit range according to a second gradation conversion characteristic that is lower in the degree of level compression (knee compression) than the first gradation conversion characteristic or causes no level compression, where M is greater than N; a correlation calculating unit for calculating data that determines correlation between the primary data and the secondary data and employing the calculated data as tertiary data; and a recording unit for recording the primary data and the tertiary data in a file.

In the above configuration, first, primary data having an N-bit range that is high in the degree of level compression and secondary data having an M-bit range (M>N) that is low in the degree of level compression are generated from the same image data. The secondary data is image data having a wider gradation reproduction range and more gradations than the primary data.

Then, the correlation calculating unit calculates data that determines correlation between the two kinds of data and employs the calculated data as tertiary data. Usually, the primary data and the secondary data are very similar to each other in the manner of gradation variation because they have been generated from the same image data. Therefore, as a result of the correlation calculation operation, redundant similarities between the two kinds of data can be discriminated properly and tertiary data that reliably includes meaningful variation components (e.g., gradation data in the secondary data that does not exist in the primary data) can be obtained.

The recording unit records the thus-obtained primary data and tertiary data. The amount of recording data can be reduced properly because redundant similarities between the two kinds of data can be discriminated in advance in contrast to a case of recording the primary data and the secondary data separately.

It is preferable that the recording unit be a unit for recording the primary data by irreversibly compressing it, and that correlation calculating unit expand the irreversibly compressed primary data, calculate data that determines correlation between expanded primary data and the secondary data, and employ the calculated data as the tertiary data. Because the primary data is compressed irreversibly, irreversibly variations occur in the primary data as it is compressed and expanded. In this case, since the reference (primary data) to be used for reproducing the secondary data deviates, the secondary data can no longer be reproduced completely. In view of this, the correlation calculating unit expands the primary data that has been compressed for recording and thereby generates expanded primary data that is the same as primary data to be obtained at the time of reproduction. The correlation calculating unit generates tertiary data by using the expanded primary data as a reference. Therefore, the reference to be used at the time of reproduction does not deviate and hence the secondary data can be reproduced more precisely.

It is preferable that the recording unit record the primary data in an "image storage segment to be preferentially referred to", which is in the file. In this case, by using a general-purpose image browsing program or the like, the primary data can be read out and printed or displayed easily in the same manner as in the case of handling a conventional image file. In other words, compatibility with conventional image files can be maintained.

It is preferable that the recording unit record the tertiary data in an application segment (i.e., one or a plurality of data segments able to be optionally added to an image file) which is in the file. By using an application segment, compatibility with conventional image files can be maintained.

It is preferable that the first gradation conversion characteristic and the second gradation conversion characteristic have the same characteristic curve in at least a part of the entire input signal range. By partially equalizing the first and second gradation conversion characteristics, the similarity between the two gradation conversion characteristics can be increased. Therefore, in the process of generating tertiary data by correlation calculating, the amount of recording data of the image file can be reduced more reliably.

It is preferable that the correlation calculating unit calculate data relating to dissimilarity between the primary data and the secondary data and employ the calculated data as the tertiary data. In this case, it is not necessary to perform complex correlation detecting calculations and hence tertiary data can be generated at high speed. The image reproducing apparatus side is also given an advantage that the secondary data can be reproduced at high speed by such simple processing as addition of the primary data and the tertiary data.

It is preferable that the recording unit compress the tertiary data by nonlinearly quantizing it and record the compressed tertiary data in the file. Usually, tertiary data includes such data as high-luminance-side or low-luminance-side gradation components. In general, the sensitivity of human vision is low to small level differences in such gradation components. Therefore, nonlinearly quantizing the tertiary data makes it possible to compress the tertiary data in such a range that the compression is not visually discernible.

It is preferable that the recording unit compress the tertiary data by increasing sampling increments of the tertiary data on an image space and record the compressed tertiary data in the file. Eliminating pieces of the tertiary data to the level in which the visual sensitivity is low (decimation) makes it possible to compress the tertiary data in such a range that the degradation is not visually discernible. This measure is not limited to use in decimation. For example, the sampling increments may be increased by reducing high spatial frequency components of the tertiary data.

It is preferable that the recording unit divide the tertiary data into map data indicating shapes of non-correlation regions (i.e., regions where substantial dissimilarities exist between the primary data and the secondary data) and data indicating values of the non-correlation regions. Recording the tertiary data in this form makes it possible to eliminate redundant data in regions other than the non-correlation regions and thereby compress the tertiary data. The image reproducing apparatus side can easily reproduce the secondary data by re-disposing the data indicating values based on the map data.

It is preferable that the recording unit record pieces of the tertiary data at non-coincidence positions (i.e., positions of an image where the secondary data cannot be calculated directly from the primary data) in the file. For example, the primary data and the secondary data correspond to each other approximately one to one at positions having pixel values for which the first and second gradation conversion characteristics coincide with each other. At positions where the correlation between the primary data and the secondary data is very strong, secondary data can be calculated to some extent from the primary data without using the tertiary data. Therefore, with this measure, the data amount of the tertiary data can be reduced efficiently by recording only pieces of the tertiary data at the non-coincidence positions. An image reproducing apparatus (described later) discriminates the non-coincidence positions according to the primary data as reproduced, and re-disposes the recorded tertiary data on the image space. It is therefore preferable that the image recording apparatus discriminate non-coincidence positions in a manner that the image reproducing apparatus can find the same non-coincidence positions.

It is preferable that the recording unit compress the tertiary data by run-length coding, entropy coding, and/or predictive coding and record the compressed tertiary data in the file. Usually, tertiary data is calculated according to the primary data and the secondary data of the same image data. Therefore, it is highly probable that the same data appears consecutively in the tertiary data. The data size of such tertiary data can be reduced by performing run-length coding. It is highly probable that invalid data or the same data appears at a high frequency in the tertiary data. The data size of such tertiary data can be reduced by performing entropy coding. Since tertiary data is calculated from image data having strong spatial correlation from the start, it is highly probable that the tertiary data also becomes a data array having strong spatial correlation. The data size of such tertiary data can be reduced by performing predictive coding. Performing a proper combination of predictive coding, run-length coding, and entropy coding makes it possible to compress the tertiary data into data having an even smaller data size.

It is preferable that the second converting unit change the second gradation conversion characteristic in accordance with a feature of the image data.

In general, image data that are produced by imaging exhibit one of the following various features depending on the object, the imaging conditions, and the illumination conditions:

Including many high-luminance-side gradation components.
Including many low-luminance-side gradation components.
Including many intermediate-luminance gradation components.
Including gradation components in a wide luminance range from the low-luminance side to the high-luminance side.

The above configuration makes it possible to judge features of the image data such as size or deviation of a input signal range, and change the second gradation conversion characteristic in accordance with the feature. This makes it possible to generate secondary data that reflects the feature of the image data faithfully. To faithfully reproduce such secondary data afterwards, it is preferable that the primary data and the tertiary data be recorded together.

It is preferable that an image processing program for realizing, on a computer, the functions of the first converting unit, the second converting unit, the correlation calculating unit, and the recording unit be generated and recorded on a recording medium.

It is preferable that the functions of the first converting unit, the second converting unit, the correlation calculating unit, and the recording unit be converted into steps and that the steps be executed sequentially as an image recording method.

On the other hand, the invention provides an image reproducing apparatus for reproducing a file generated by the above image recording apparatus reading unit for reading primary data and tertiary data from a file generated by the above-described image recording apparatus; and secondary data calculating unit for reproducing secondary data based on the primary data and the tertiary data. The tertiary data that is read out in this manner includes data that determines correlation between the primary data and the secondary data. Secondary data (not necessarily the secondary data itself but may be data that is close to the secondary data at the time of recording and that has a wide gradation reproduction range and a large number of signal levels) is reproduced based on this tertiary data and the primary data.

It is preferable that first the reading unit read the primary data, and the tertiary data on non-coincidence positions, and that the secondary data calculating unit discriminate the non-coincidence positions according to pixel values of the primary data. For example, the non-coincidence positions may be discriminated by judging whether the pixel value of the primary data belongs to a non-coincidence portion of the first and second conversion characteristics. The reading unit disposes the tertiary data at the non-coincidence positions and perform positioning between the primary data and the tertiary data. The secondary data calculating unit reproduces the secondary data based on the primary data and the tertiary data that corresponds to the primary data in pixel positions.

It is preferable that the secondary data calculating unit level-compress (knee-compress) the secondary data to be data which has a range that is gradation-reproducible by an external apparatus, and output the level-compressed data. One use of such secondary data is data processing for printing and designing. For such data processing purposes, it is preferable that the reproduced secondary data be output as it is in M-bit-gradation form. On the other hand, there is another use in which users can enjoy a wide gradation reproduction range and affluent gradation variations with an external apparatus (e.g., a display apparatus or a printing apparatus). However, such external apparatuses do not give standard support to such M-bit-gradation. In view of this, the image reproducing apparatus outputs the secondary data after level-compressing it so that the data has a luminance range gradation-reproducible by an external apparatus. This level compression allows users to enjoy high-quality features of the secondary data easily with the external apparatus.

It is preferable that an image processing program for realizing, on a computer, the functions of the reading unit and the secondary data calculating unit be generated and recorded on a recording medium.

It is preferable that the functions of the reading unit and the secondary data calculating unit be converted into steps and that the steps be executed sequentially as an image reproducing method.

BRIEF DESCRIPTION OF THE DRAWINGS

The nature, principle, and utility of the invention will become more apparent from the following detailed description when read in conjunction with the accompanying drawings in which like units are designated by identical reference numbers, in which:

FIG. 8 is a graph showing gradation conversion characteristics used at the time of reproduction in the second embodiment.

DESCRIPTION OF THE PREFERRED EMBODIMENTS

Preferred embodiments of the present invention will be hereinafter described with reference to the accompanying drawings.

Embodiment 1

A first embodiment is directed to a digital still camera.

Figure 1:
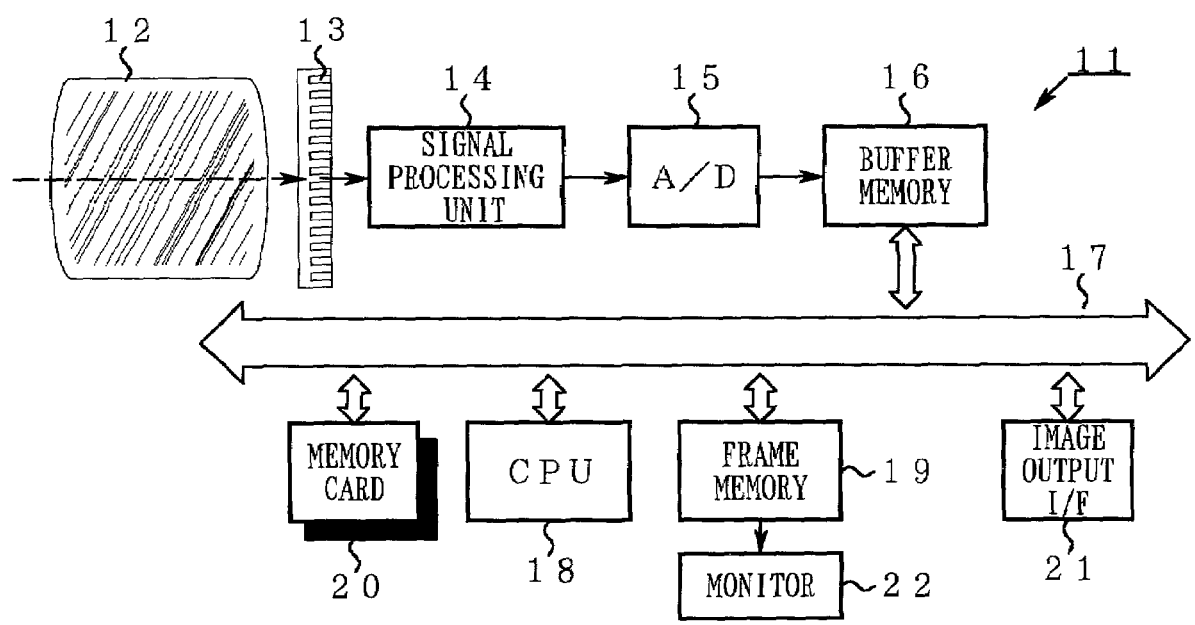
FIG. 1 is a block diagram showing the configuration of a digital still camera 11.

FIG. 1 is a block diagram showing the configuration of a digital still camera 11 according to this embodiment.

As shown in FIG. 1, an imaging lens 12 is mounted on the digital still camera 11. The imaging surface of an imaging device 13 is disposed in the image space of the imaging lens 12. Image data produced by the imaging device 13 are supplied to a buffer memory 16 via a signal processing unit 14 and an A/D conversion unit 15 and stored temporarily in the buffer memory 16. An input/output terminal of the buffer memory 16 is connected to a data bus 17. A CPU 18, a frame memory 19, a memory card 20, an image output interface 21, etc. are also connected to the data bus 17. An output terminal of the frame memory 19 is connected to a monitor 22.

1. Image Recording Process

Figure 2:
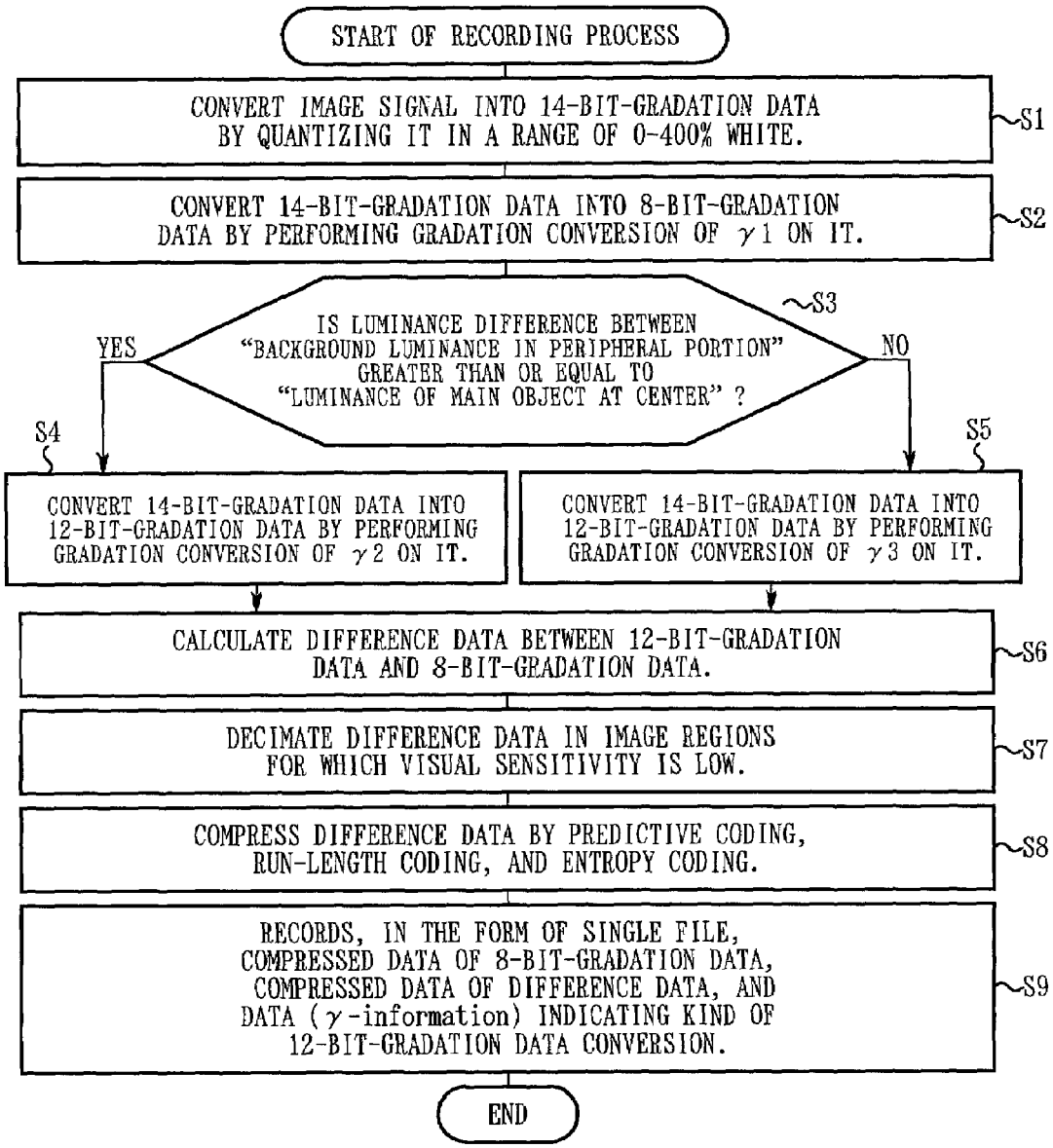
FIG. 2 is a flowchart showing an image recording process according to a first embodiment of the present invention.

FIG. 2 is a flowchart showing an image recording process according to the first embodiment.

The image recording process according to the first embodiment will be described below in order of step numbers shown in FIG. 2.

Step S1:

An image signal produced by the imaging device 13 is supplied to the A/D conversion unit 15 via the signal processing unit 14.

The A/D conversion unit 15 converts the image signal into 14-bit-gradation data by linearly quantizing the image signal in a dynamic range of 0–400% white. The A/D conversion unit 15 stores the 14-bit-gradation data in the buffer memory 16 (temporary storage).

Figure 4:
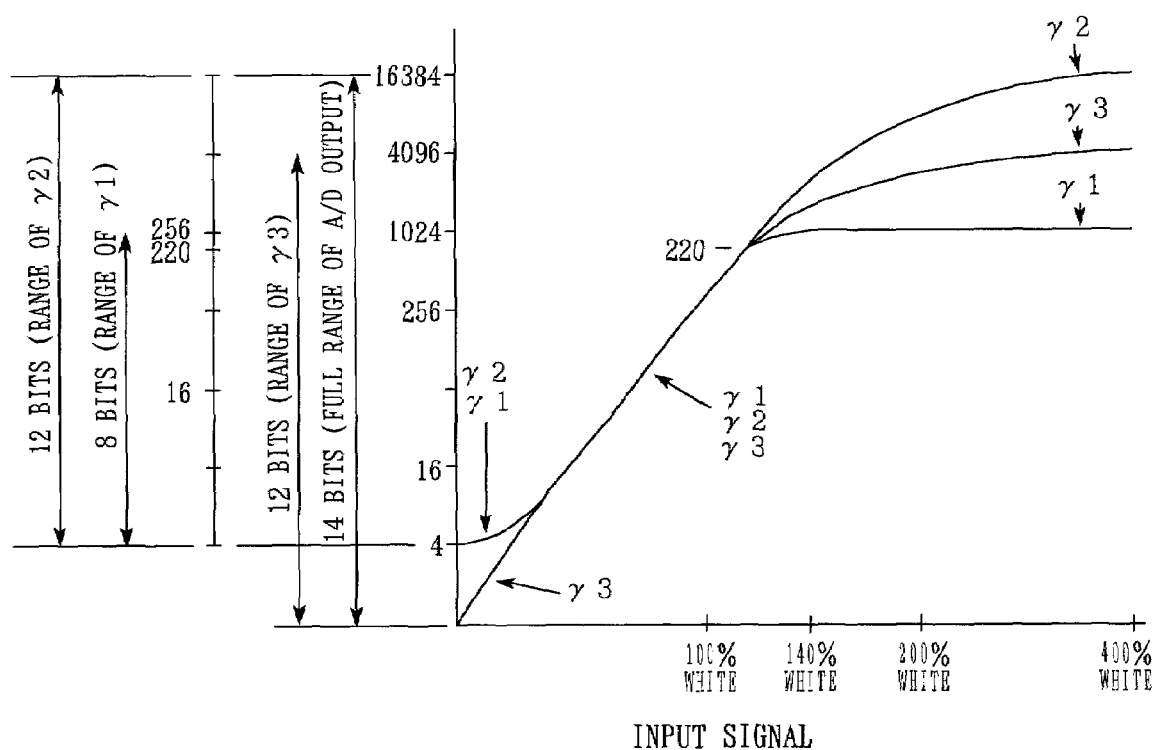
FIG. 4 is a graph showing gradation conversion characteristics used in the first embodiment.

Step S2:

The CPU 18 performs gradation conversion of γ1 (see FIG. 4) on the 14-bit-gradation data and obtains 8-bit-gradation data. The CPU 18 stores the 8-bit-gradation data in the buffer memory 16 (temporary storage).

Step S3:

The CPU 18 judges whether the luminance difference between "background luminance in an image space peripheral portion" and "main object luminance at the image space center" of the 14-bit-gradation data is larger than a threshold value. If the luminance difference is greater than or equal to the threshold value, the CPU 18 judges that high-luminance-side gradation components exist and hence importance should be given to high-luminance-side gradation expression and advances the process to step S4. On the other hand, if the luminance difference is smaller than the threshold value, the CPU 18 judges that the dynamic range is not wide and importance should be given to low-luminance-side, subtle gradation expression and advances the process to step S5.

Step S4:

The CPU 18 performs gradation conversion of γ2 (see FIG. 4; having a characteristic in which importance is given to high-luminance-side gradation expression) on the 14-bit-gradation data and obtains 12-bit-gradation data. The CPU 18 stores the 12-bit-gradation data in the buffer memory 16 (temporary storage). Then, the CPU 18 advances the process to step S6.

Step S5:

The CPU 18 performs gradation conversion of γ3 (see FIG. 4; having a characteristic in which importance is given to low-luminance-side gradation expression) on the 14-bit-gradation data and obtains 12-bit-gradation data. The CPU 18 stores the 12-bit-gradation data in the buffer memory 16 (temporary storage). Then, the CPU 18 advances the process to step S6.

Step S6:

The CPU 18 calculates differences between the 12-bit-gradation data and the 8-bit-gradation data and employs the calculated differences as difference data. The difference data thus calculated is stored in the buffer memory 16 (temporary storage). (The 8-bit-gradation data, the 12-bit-gradation data, and the different data correspond to primary data, secondary data, and tertiary data, respectively.)

When 12-bit-gradation data is generated by using the gradation conversion characteristic γ3, an offset of 2 bits occurs between the 12-bit-gradation data and the 8-bit-gradation data. In this case, difference data is calculated after eliminating the offset between the two kinds of gradation data by multiplying the 8-bit-gradation data by 4 (2 bit shift left).

Step S7:

The CPU 18 determines image regions having extremely high luminance according to the 8-bit-gradation data. Image regions having extremely high luminance need not be reproduced finely because the visual sensitivity is low for those regions. Therefore, in the image regions for which the visual sensitivity is low, the CPU 18 decimates the samples of the difference data into about ½ or ¼. Where irreversible compression is performed on the 8-bit-gradation data, to make a result of the image region judgment consistent with an image region judgment result that will be obtained at the time of reproduction, it is preferable that the CPU 18 perform the image region judgment according to temporary, expanded 8-bit-gradation data.

Step S8:

The CPU 18 compresses the difference data by performing predictive coding (e.g., DPCM). Then, the CPU 18 further compresses the difference data by performing run-length coding. Then, the CPU 18 still further compresses the difference data by performing entropy coding.

Step S9:

The CPU 18 combines the data into a single file in the following manner and records the file in the memory card 20.

Compressed data of 8-bit-gradation data . . . An image storage segment of a general-purpose image file (e.g., a JPEG file)

Compressed data of difference data . . . An application segment of the general-purpose image file γ information (i.e., information indicating the kind of the gradation conversion characteristic that was used for the conversion into the 12-bit-gradation data).

The recording process of the digital still camera 11 completes upon execution of step S9.

2. Image Reproducing Process

Figure 3:
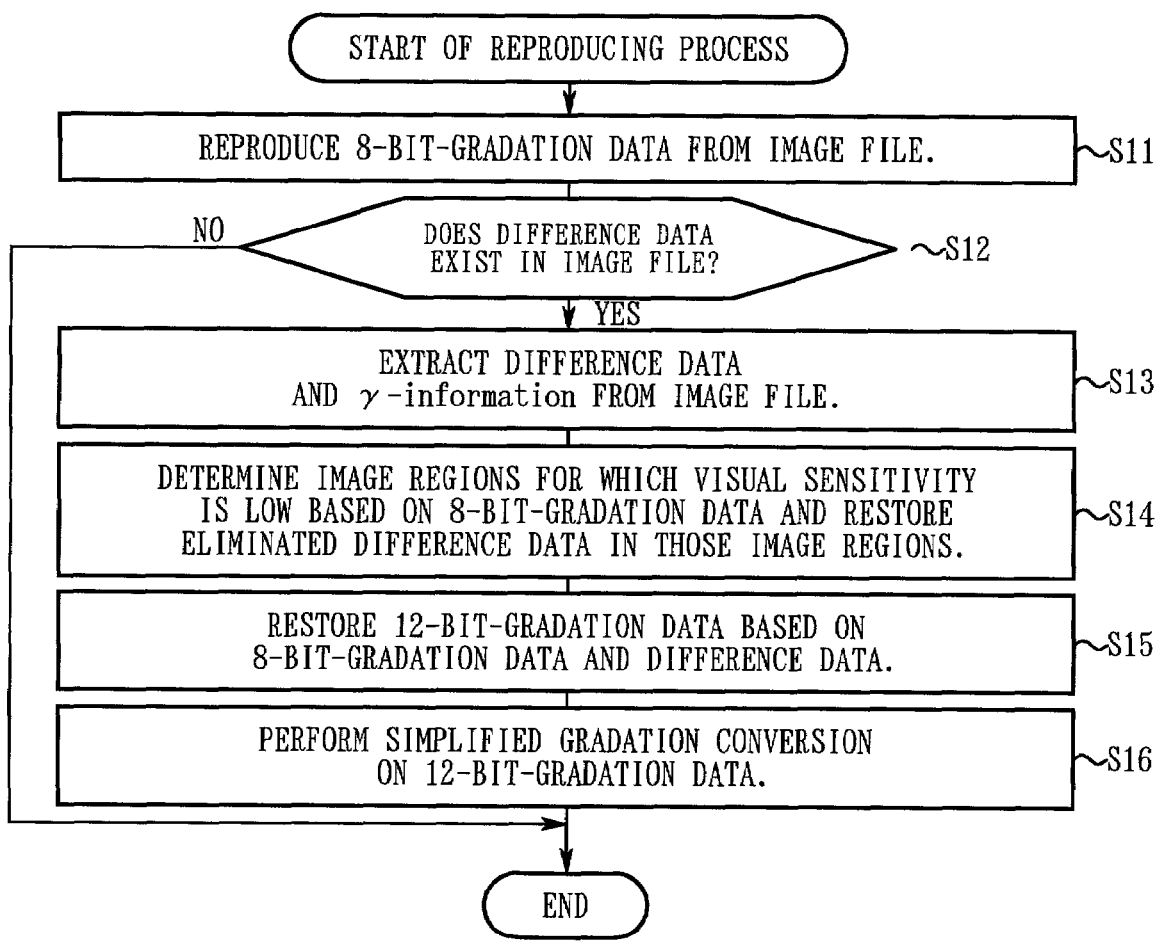
FIG. 3 is a flowchart showing an image reproducing process according to the first embodiment.

FIG. 3 is a flowchart showing an image reproducing process according to the first embodiment.

The image reproducing process according to the first embodiment will be described below in order of step numbers shown in FIG. 3.

Step S11:

The CPU 18 reproduces 8-bit-gradation data from an image file that is recorded in the memory card 20.

Step S12:

The CPU 18 judges whether difference data exists in the image file recorded in the memory card 20. If difference data exists in the image file, the CPU 18 advances the process to step S13. On the other hand, if difference data does not exist in the image file, the CPU 18 judges that the image file is a conventional one and finishes the reproducing process.

Step S13:

The CPU 18 extracts the difference data and γ information from the image file recorded in the memory card 20. Further, the CPU 18 sequentially performs, on the difference data, expanding operations corresponding to entropy coding, run-length coding, and predictive coding in this order.

Step S14:

According to the 8-bit-gradation data, the CPU 18 judges image regions for which the visual sensitivity is low. In those image regions, the CPU 18 infers, according to surrounding difference data etc., difference data that was eliminated at the time of recording.

Step S15:

The CPU 18 restores 12-bit-gradation data by adding the difference data to the 8-bit-gradation data.

If it is judged according to the γ information that the gradation conversion characteristic γ3 was used at the time of recording, the CPU 18 restores 12-bit-gradation data by adding the difference data to the 8-bit-gradation data as multiplied by 4 (2 bit shift left).

Step S16:

The CPU 18 outputs the thus-generated 12-bit-gradation data together with the γ information etc. to the external system via the interface 21. Further, the CPU 18 converts the 12-bit-gradation data into 8-bit-gradation data by performing simplified gradation conversion (e.g., one having a characteristic γ4' shown in FIG. 8) for monitor display or printing in an external apparatus on the 12-bit-gradation data and outputs the resulting 8-bit-gradation data.

The reproducing process of the digital still camera 11 completes upon execution of step S16.

3. Advantages etc. of First Embodiment

In the first embodiment, according to the above-described process, 12-bit-gradation data is not recorded as it is but recorded as 8-bit-gradation data and difference data. Therefore, the amount of recording data can be made smaller properly and easily than in a case where 12-bit-gradation data is compressed and recorded separately.

In the first embodiment, two gradation conversion characteristics (γ1 and γ2 or γ1 and γ3 in FIG. 4) coincide with each other in the middle portion of the input signal range. Therefore, 8-bit-gradation data and 12-bit-gradation data correspond to each other approximately one to one in the main input signal range. The compression efficiency of difference data can be increased more by making the correlation between 8-bit-gradation data and 12-bit-gradation data stronger in this manner.

In the first embodiment, in image regions (high-luminance regions or low-luminance regions) for which the visual sensitivity is low, difference data is recorded after being decimated. This makes it possible to efficiently compress difference data in such a range that the decimation is not visually discernible.

In the first embodiment, difference data can be compressed efficiently by performing predictive coding, run-length coding, and entropy coding on it.

In the first embodiment, since the second gradation conversion characteristic is changed in such a manner as to be adapted to a feature of image data, 12-bit-gradation data that is more affluent in gradation can be generated.

In the first embodiment, 12-bit-gradation data that is affluent in gradation can be reproduced when necessary based on recorded 8-bit-gradation data and difference data.

Further, in the first embodiment, 12-bit-gradation data that has been reproduced in the above manner is gradation-converted in a simplified manner and resulting gradation data is output. Therefore, a user can easily enjoy use of 12-bit-gradation data that is affluent in gradation with an external apparatus.

Next, another embodiment will be described.

Embodiment 2

A second embodiment is directed to a digital still camera.

The configuration of the digital still camera according to the second embodiment is the same as that of the digital still camera according to the first embodiment (see FIG. 1). Therefore, the reference numerals of the respective components shown in FIG. 1 will also be used in the following description as they are and the configuration of the digital still camera will not be described in the second embodiment.

1. Image Recording Process

Figure 5:
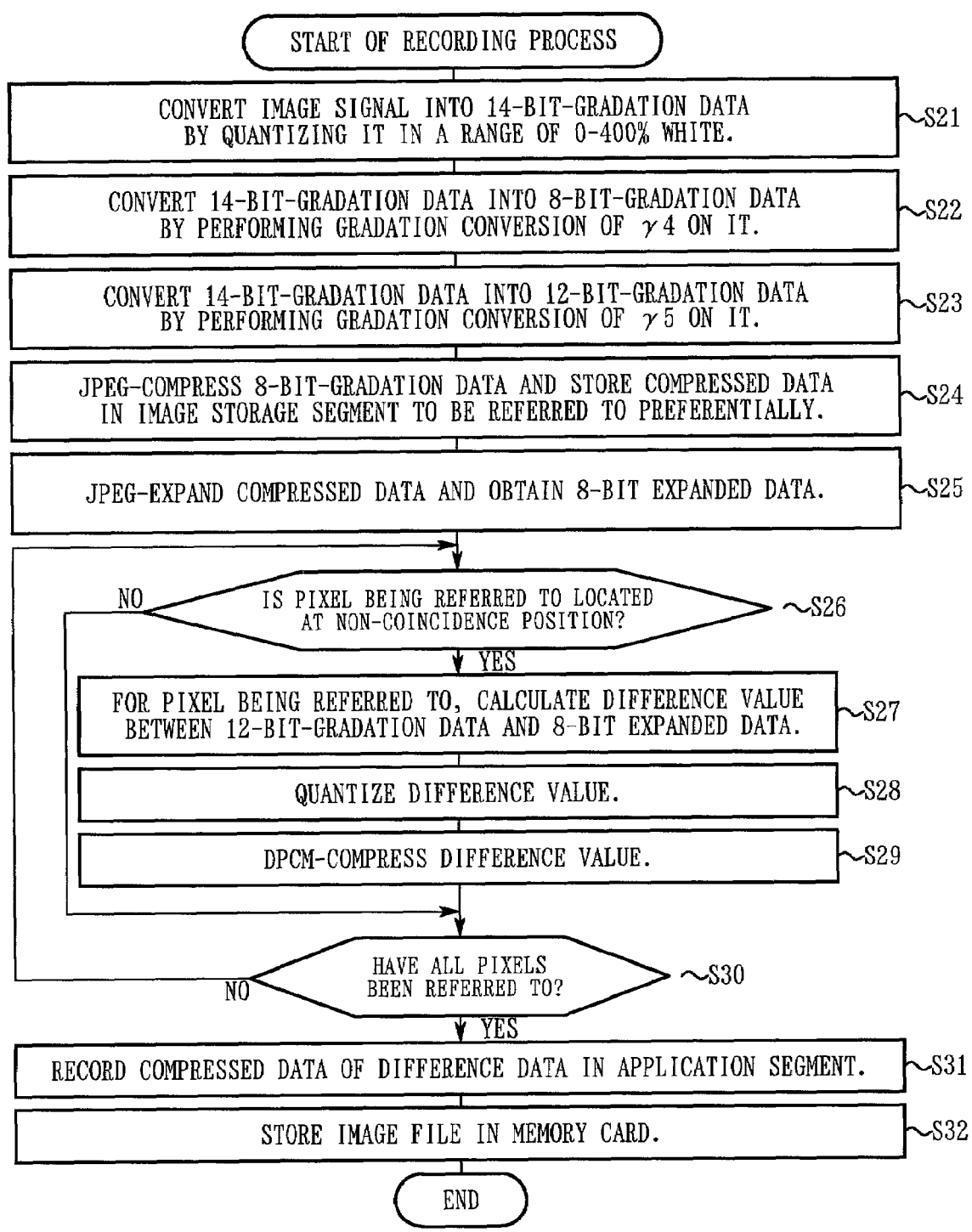
FIG. 5 is a flowchart showing an image recording process according to a second embodiment of the invention.

FIG. 5 is a flowchart showing an image recording process according to the second embodiment.

The image recording process according to the second embodiment will be described below in order of step numbers shown in FIG. 5.

Step S21:
The A/D conversion unit 15 converts an image signal into 14-bit-gradation data by linearly quantizing the image signal in a dynamic range of 0%–400% white.

Step S22:
The CPU 18 converts the 14-bit-gradation data into 8-bit-gradation data by performing gradation conversion of γ4 (see FIG. 7) on it. In this case, it is preferable that the gradation conversion assure gradation reproduction up to about 140% white.

Step S23:
The CPU 18 converts the 14-bit-gradation data into 12-bit-gradation data by performing gradation conversion of γ5 (see FIG. 7) on it. In this case, it is preferable that the gradation conversion assure gradation reproduction up to 200% white (if possible, about 400% white).

Step S24:
The CPU 18 JPEG-compresses the 8-bit-gradation data and stores compressed data in an "image storage segment to be preferentially referred to", which is in an image file.

Step S25:
The CPU 18 JPEG-expands the compressed 8-bit-gradation data and obtains 8-bit-gradation expanded data (hereinafter referred to as "8-bit expanded data").

Step S26:
The CPU 18 sequentially refers to the 8-bit expanded data on a pixel-by-pixel basis and judges whether the pixel being referred to is located at a non-coincidence position. The term "non-coincidence position" means a position where the 8-bit part of the 12-bit-gradation data does not coincide with the 8-bit expanded data. At such a non-coincidence position, difference data is necessary for reproduction of a 12-bit gradation. Conversely, at a coincidence position, difference data is not necessary because 12-bit-gradation data can be reproduced from the 8-bit expanded data.

Specifically, if the 8-bit expanded data of the pixel being referred to exceeds a predetermined threshold value (indicated by character A in FIG. 7), the CPU 18 judges that the pixel is located at a non-coincidence position because difference data is necessary for reproduction of 12-bit-gradation data. On the other hand, if the 8-bit expanded data of the pixel being referred to is smaller than or equal to the threshold value A, the CPU 18 judges that reproducing 12-bit-gradation data from the 8-bit expanded data is sufficient practically and hence judges that the pixel being referred to is not located at a non-coincidence position.

If the pixel being referred to is located at a non-coincidence position, the CPU 18 advances the process to step S27. On the other hand, if the pixel being referred to is not located at a non-coincidence position, the CPU 18 advances the process to step S30.

Step S27:
For the pixel being referred to, the CPU 18 calculates a difference value between the 12-bit-gradation data and the 8-bit expanded data.

Step S28:
The CPU 18 nonlinearly quantizes the difference value according to a characteristic for compressing high-luminance-side (or low-luminance-side) gradations and thereby decreases the number of quantization bits.

Step S29:
The CPU 18 further DPCM-compresses the difference value whose number of quantization bits has been decreased.

Step S30:
The CPU 18 judges whether all pixels have been referred to. If all pixel have been referred to, the CPU 18 advances the process to step S31. On the other hand, if not all pixels have been referred to yet, the CPU 18 returns the process to step S26 to execute steps S26–S30 again.

Step S31:

The CPU 18 stores the compressed data of the difference data (i.e., an array of difference values that have been calculated in the above manner) in an application segment in the image file.

Step S32:

The CPU 18 transfers the image file thus generated to the memory card 20 and stores the image file therein.

The recording process according to the second embodiment completes upon execution of step S32.

2. Image Reproducing Process

Figure 6:
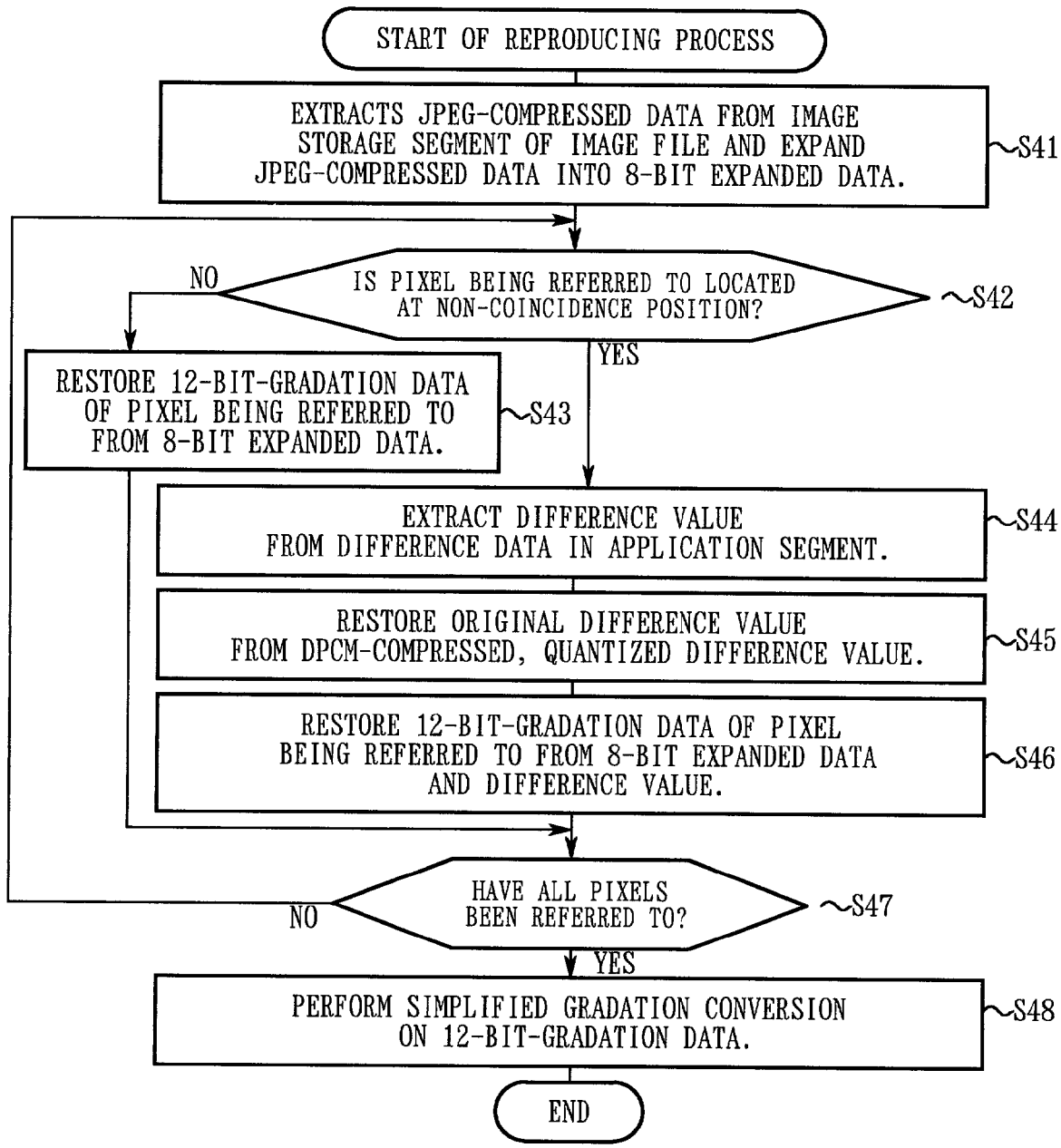
FIG. 6 is a flowchart showing an image reproducing process according to the second embodiment.

FIG. 6 is a flowchart showing an image reproducing process according to the second embodiment.

The image reproducing process according to the second embodiment will be described below in order of step numbers shown in FIG. 6.

Step S41:

The CPU 18 extracts JPEG-compressed data from the image storage segment of an image file stored in the memory card 20 and expands the JPEG-compressed data into 8-bit expanded data.

Step S42:

The CPU 18 sequentially refers to the 8-bit expanded data on a pixel-by-pixel basis, and judges whether the pixel being referred to is located at a non-coincidence position.

Specifically, if the 8-bit expanded data of the pixel being referred to is smaller than or equal to the threshold value A, the CPU 18 judges that the pixel being referred to is not located at a non-coincidence position and advances the process to step S43. On the other hand, if the 8-bit expanded data of the pixel being referred to exceeds the threshold value A, the CPU 18 judges that the pixel being referred to is located at a non-coincidence position and advances the process to step S44.

Figure 7:
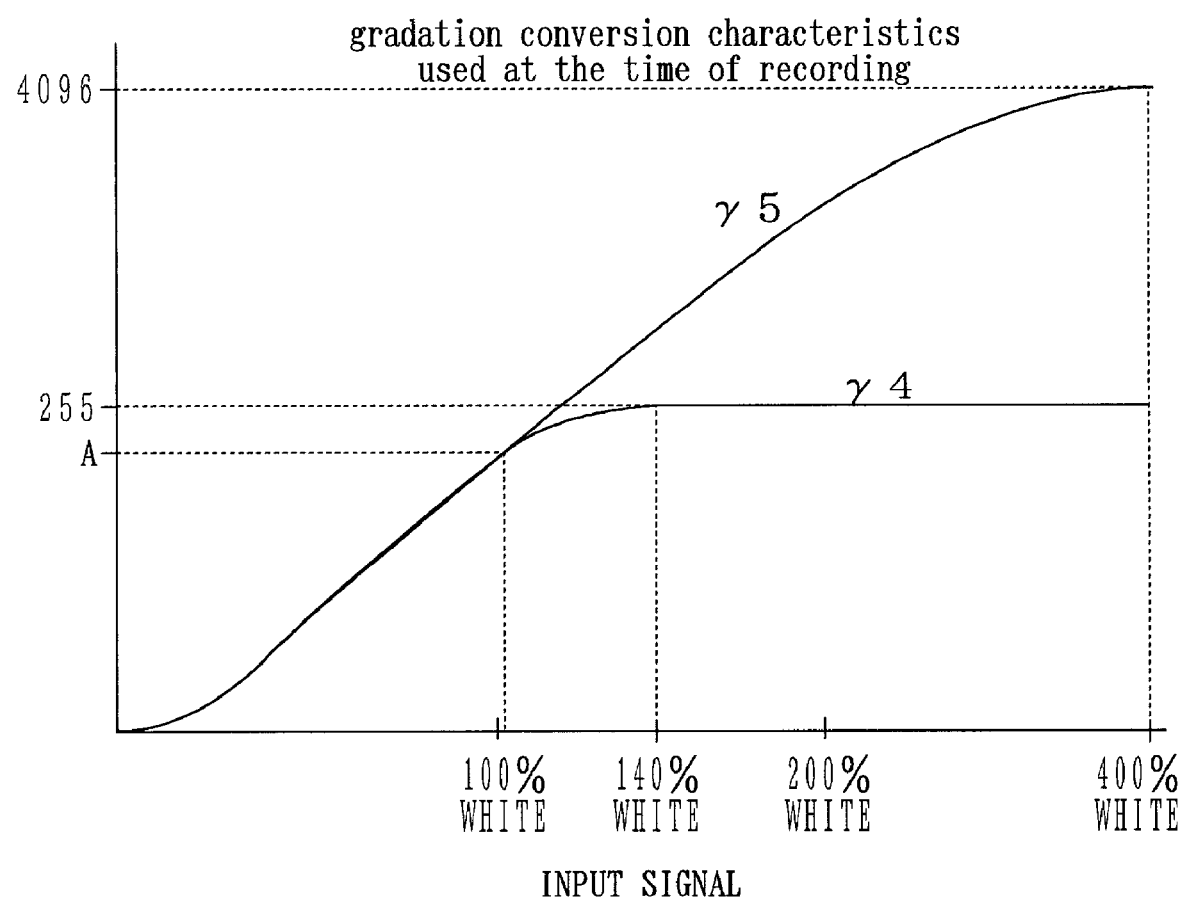
FIG. 7 is a graph showing gradation conversion characteristics used at the time of recording in the second embodiment.

Step S43:

The CPU 18 calculates 12-bit-gradation data from the 8-bit expanded data of the pixel being referred to (with the characteristic shown in FIG. 7, the 8-bit expanded data may be employed as it is as 12-bit-gradation data). Then, the CPU 18 advances the process to step S47.

Step S44:

The CPU 18 extracts a difference value from difference data in the application segment of the image file.

Step S45:

The CPU 18 restores an original difference value from the DPCM-compressed difference value. Further, the CPU 18 expands a high-luminance-side (or low-luminance-side) gradation of the difference value and thereby restores the corrected value by inverse-quantization of the difference value.

Step S46:

The CPU 18 adds the restored difference value to the 8-bit expanded data and thereby reproduces 12-bit-gradation data of the pixel being referred to.

Step S47:

The CPU 18 judges whether all pixels have been referred to. If all pixels have been referred to, the CPU 18 advances the process to the next step S48. On the other hand, if not all pixels have been referred to, the CPU 18 returns the process to step S42 to execute steps S42-S47 again.

Step S48:

The CPU 18 converts the 12-bit-gradation data thus calculated into 8-bit-gradation data by performing simplified gradation conversion (e.g., by sequentially performing conversion having a characteristic that is reverse to a characteristic γ5 shown in FIG. 8 and conversion having a characteristic γ4' shown in FIG. 8) for monitor display or printing in an external apparatus on the 12-bit-gradation data, and outputs the resulting 8-bit-gradation data.

The reproducing process of the digital still camera 11 completes upon execution of step S48.

3. Advantages etc. of Second Embodiment

Also in the second embodiment, according to the above-described process, 12-bit-gradation data is not recorded as it is but recorded as 8-bit-gradation data and difference data. Therefore, the amount of recording data can be made smaller properly and easily than in a case where 12-bit-gradation data is compressed and recorded separately.

In the second embodiment, two gradation conversion characteristics (γ4 and γ5 in FIG. 7) coincide with each other up to the gradation value A. Therefore, the correlation between 8-bit-gradation data and 12-bit-gradation data becomes stronger and hence the compression efficiency of difference data can be increased more.

In the second embodiment, in a input signal range where the visual sensitivity is low, difference data is recorded after being level-compressed (nonlinearly quantized). This makes it possible to rationally decrease the number of quantization bits of the difference data in such a range that the compression is not visually discernible.

In the second embodiment, 8-bit-gradation data is recorded in an "image storage segment to be preferentially referred to", which is in an image file. And difference data is recorded in the application segment of the image file. This recording method makes it possible to reliably maintain compatibility with conventional image files. Therefore, 8-bit-gradation data in an image file according to the invention can be processed, displayed, or printed by using a general-purpose image browsing program or a general-purpose external apparatus as it is.

In the second embodiment, at the time of image recording, difference data is generated based on 8-bit expanded data and 12-bit-gradation data. Therefore, at the time of image reproduction, 12-bit-gradation data can be reproduced more correctly based on the 8-bit expanded data and the difference data.

In the second embodiment, at the time of reproduction, tertiary data and primary data are correlated with each other by performing the non-coincidence position judgment. With this operation, the tertiary data need not include map data and an advantage is provided that the data amount of the tertiary data can be reduced efficiently.

Tertiary data may be recorded so as to be divided into map data of non-correlation regions and value data. In this case, compressed data of a binary bit map indicating whether each pixel belongs to a non-correlation region may be recorded as the map data. Alternatively, data (e.g., chain coding data) indicating outline shapes of non-correlation regions or like data may be recorded as the map data.

Further, in the second embodiment, the data amount of difference data may further be reduced by increasing the difference data sampling increment. In addition, the reproduction performance of gradations of secondary data may further be increased by automatically changing the gradation conversion characteristic γ5 shown in FIG. 7 in accordance with a feature of image data.

Supplements to Embodiments

For convenience of description, the above embodiments are examples in which the invention is applied to a digital still camera. However, the invention is not limited to such a case and can be used in recording or reproducing image data having a wide dynamic range. For example, an image processing program for execution of any of the above processes (e.g., the processes described above with reference to FIGS. 2, 3, 5, and 6) may be written in a predetermined programming language and recorded on a machine-readable recording medium.

The manner of practicing part of the invention relating to such an image processing program is not limited to the above. For example, by delivering data of such an image processing program via a communication line, a "recording medium such as a memory or a hard disk on which the image processing program is recorded" can be produced in a computer at a delivering destination. Further, it is possible to mediate a transfer of such an image processing program or manufacture of a recording medium by informing a party concerned about the location of the program.

The same operations and advantages as obtained by the above embodiments can be obtained on a computer by using such a recording medium.

It is possible to practice an image recording method and an image reproducing method according to the procedures of the above processes (e.g., the processes described above with reference to FIGS. 2, 3, 5, and 6). Also in this case, the same operations and advantages as obtained by the above embodiments can be obtained.

Although the above embodiments are mainly directed to gradation processing, the invention is not limited to such a case. For example, in the case of handling color image data, the above-described processing may be performed for the gradation of each of stimulus values of RGB, YCbCr, etc.

For example, tertiary data may be calculated for only a component having high luminous efficiency (e.g., Y or G) among stimulus values of color image data. This makes it possible to further reduce the data amount of tertiary data. In this case, at the time of reproduction, secondary data may be reproduced by using primary data and tertiary data that is formed by a component having high luminous efficiency. This reproducing process cannot completely (100%) restore components (CbCr, RB, or the like to which the visual sensitivity is low) that are not included in the tertiary data. However, it is possible to reproduce secondary data in such a range that it is suitable for practical use in terms of visual recognition.

Although the above embodiments use difference data as tertiary data, the invention is not limited to such a case. In general, any data that determines correlation between primary data and secondary data can be used as tertiary data. For example, a ratio between primary data and secondary data may be calculated as dissimilarity between them and used as tertiary data.

In the first embodiment, tertiary data is compressed in as high a degree as possible by performing multiple coding, that is, performing predictive coding, run-length coding, and entropy coding. However, the invention is not limited to such a case. For example, tertiary data may be compressed by performing one or two of predictive coding, run-length coding, and entropy coding. Naturally, tertiary data may be recorded without being compressed.

In the above embodiments, 8-bit-gradation data is employed as primary data and 12-bit-gradation data is employed as secondary data. It goes without saying that the numbers of gradations are unlimited to those of 8 bits and 12 bits.

Although the above embodiments are directed to the case of handling a still image, the invention is not limited to such a case. For example, the invention may be applied to a case of handling a moving image. In this case, for example, tertiary data may be compressed in the time-axis direction.

Although in the above embodiments a generated image file is stored in a memory card, the recording unit of the invention is not limited to being a unit for storing a file for a long period. For example, the recording unit of the invention may be a unit for storing a file temporarily in a system memory, an image memory, a buffer, or the like.

The invention is not limited to the above embodiments and various modifications may be made without departing from the spirit and scope of the invention. Any improvement may be made in part or all of the components.

What is claimed is:

1. An image recording apparatus comprising:
   a first converting unit that receives image data and converts the image data into primary data having an N-bit range according to a first gradation conversion characteristic;
   a second converting unit that receives the same image data received by the first converting unit and converts the same image data into secondary data having an M-bit range according to a second gradation conversion characteristic that is lower in a degree of level compression than the first gradation conversion characteristic or that causes no level compression, where M is greater than N;
   a dissimilarity calculating unit that receives the primary data and the secondary data and calculates dissimilarity between the primary data and the secondary data according to each position of each pixel and uses data regarding the calculated dissimilarity to output tertiary data; and
   a recording unit for recording the primary data and the tertiary data in a file.

2. The image recording apparatus according to claim 1, wherein the recording unit records the primary data in an image storage segment to be preferentially referred to, which is in the file.

3. The image recording apparatus according to claim 2, wherein the recording unit records the tertiary data in an application segment optionally able to be added, which is in the file.

4. The image recording apparatus according to claim 1, wherein the first gradation conversion characteristic and the second gradation conversion characteristic have a same characteristic curve in at least a part of an entire input signal range.

5. The image recording apparatus according to claim 1, wherein the recording unit compresses the tertiary data by nonlinearly quantizing it and records the compressed tertiary data in the file.

6. The image recording apparatus according to claim 1, wherein the recording unit compresses the tertiary data by increasing a sampling increment of the tertiary data on an image space and records the compressed tertiary data in the file.

7. The image recording apparatus according to claim 1, wherein the recording unit discriminates non-correlation regions that are image areas where a substantial dissimilarity exists between the primary data and the secondary data, and records the tertiary data in the file in a manner that the tertiary data is divided into map data indicating shapes of the non-correlation regions and data indicating values of the non-correlation regions.

8. The image recording apparatus according to claim 1, wherein the recording unit discriminates a non-coincidence position that is a position in an image where the secondary data cannot be calculated directly from the primary data, and records the tertiary data at the non-coincidence position in the file.

9. The image recording apparatus according to claim 1, wherein the recording unit compresses the tertiary data by mn-length coding, entropy coding, and/or predictive coding, and records the compressed tertiary data in the file.

10. The image recording apparatus according to claim 1, wherein the second converting unit changes the second gradation conversion characteristic in accordance with a feature of the image data.

11. An image recording apparatus comprising:
a first converting unit that receives image data and converts the image data into primary data having an N-bit range according to a first gradation conversion characteristic;
a second converting unit that receives the same image data received by the first converting unit and converts the same image data into secondary data having an M-bit range according to a second gradation conversion characteristic that is lower in a degree of level compression than the first gradation conversion characteristic or that causes no level compression, where M is greater than N;
a dissimilarity calculating unit that receives the primary data and the secondary data and calculates dissimilarity between the primary data and the secondary data according to each position of each pixel and uses data regarding the calculated dissimilarity to output tertiary data; and
a recording unit for recording the primary data and the tertiary data in a file, wherein
said recording unit is a unit for irreversibly compressing the primary data and recording the irreversibly compressed primary data, and
said dissimilarity calculating unit is a unit for expanding the irreversibly compressed primary data, calculating data that determines correlation between the expanded primary data and the secondary data, and employing the calculated data as the tertiary data.

12. The image recording apparatus according to claim 11, wherein the recording unit records the primary data in an image storage segment to be preferentially referred to, which is in the file.

13. The image recording apparatus according to claim 12, wherein the recording unit records the tertiary data in an application segment optionally able to be added, which is in the file.

14. The image recording apparatus according to claim 11, wherein the first gradation conversion characteristic and the second gradation conversion characteristic have a same characteristic curve in at least a part of an entire input signal range.

15. The image recording apparatus according to claim 11, wherein the recording unit compresses the tertiary data by nonlinearly quantizing it and records the compressed tertiary data in the file.

16. The image recording apparatus according to claim 11, wherein the recording unit compresses the tertiary data by increasing a sampling increment of the tertiary data on an image space and records the compressed tertiary data in the file.

17. The image recording apparatus according to claim 11, wherein the recording unit discriminates non-correlation regions that are image areas where a substantial dissimilarity exists between the primary data and the secondary data, and records the tertiary data in the file in a manner that the tertiary data is divided into map data indicating shapes of the non-correlation regions and data indicating values of the non-correlation regions.

18. The image recording apparatus according to claim 11, wherein the recording unit discriminates a non-coincidence position that is a position in an image where the secondary data cannot be calculated directly from the primary data, and records the tertiary data at the non-coincidence position in the file.

19. The image recording apparatus according to claim 11, wherein the recording unit compresses the tertiary data by run-length coding, entropy coding, andlor predictive coding, and records the compressed tertiary data in the file.

20. The image recording apparatus according to claim 11, wherein the second converting unit changes the second gradation conversion characteristic in accordance with a feature of the image data.

21. A computer-readable recording medium on which an image processing program is recorded, the image processing program comprising instructions to cause a computer to perform the steps of:
receiving and converting image data into primary data having an N-bit range according to a first gradation conversion characteristic;
receiving the same image data received in the first step and converting the same image data into secondary data having an M-bit range according to a second gradation conversion characteristic that is lower in a degree of level compression than the first gradation conversion characteristic or that causes no level compression, where M is greater than N;
receiving the primary data and the secondary data and calculating dissimilarity between the primary data and the secondary data according to each position of each pixel and using data regarding the calculated dissimilarity to output tertiary data; and
recording the primary data and the tertiary data in a file.

22. A recording medium according to claim 21, wherein the image processing program further comprises instructions to cause the computer to perform the steps of:
recording the primary data by irreversibly converting it; and
expanding the irreversibly compressed primary data, and calculating data that determines correlation between the expanded primary data and the secondary data, and employing the calculated data as the tertiary data.

23. An image recording method comprising the steps of:
receiving and converting image data into primary data having an N-bit range according to a first gradation conversion characteristic;
receiving the same image data received in the first step and converting the same image data into secondary data having an M-bit range according to a second gradation conversion characteristic that is lower in a degree of level compression than the first gradation conversion characteristic or that causes no level compression, where M is greater than N;
receiving the primary data and the secondary data and calculating dissimilarity between the primary data and the secondary data according to each position of each pixel and using data regarding the calculated dissimilarity to output tertiary data; and
recording the primary data and the tertiary data in a file.

24. The image recording method according to claim 23, further comprising the steps of:

recording the primary data by irreversibly converting it; and expanding the irreversibly compressed primary data, and calculating data that determines correlation between the expanded primary data and the secondary data, and employing the calculated data as the tertiary data.

25. An image reproducing apparatus for reproducing a file generated by an image recording apparatus, the image recording apparatus having: a first converting unit that receives image data and converts the image data into primary data having an N-bit range according to a first gradation conversion characteristic; a second converting unit that receives the same image data received by the first converting unit and converts the same image data into secondary data having an M-bit range according to a second gradation conversion characteristic that is lower in a degree of level compression than the first gradation conversion characteristic or that causes no level compression, where M is greater than N; a dissimilarity calculating unit that receives the primary data and the secondary data and calculates dissimilarity between the primary data and the secondary data according to each position of each pixel and uses data regarding the calculated dissimilarity to output tertiary data; and a recording unit for recording the primary data and the tertiary data in the file, the image reproducing apparatus comprising:

a reading unit for reading the primary data and the tertiary data from the file; and a secondary data calculating unit for reproducing the secondary data based on the primary data and the tertiary data read by the reading unit.

26. The image reproducing apparatus according to claim 25, wherein the secondary data calculating unit level-compresses the secondary data so that the data has a bit range gradation-reproducible by an external apparatus, and outputs the level-compressed data.

27. An image reproducing apparatus for reproducing a file generated by an image recording apparatus, the image recording apparatus having: a first converting unit that receives image data and converts the image data into primary data having an N-bit range according to a first gradation conversion characteristic; a second converting unit that receives the same image data received by the first converting unit and converts the same image data into secondary data having an M-bit range according to a second gradation conversion characteristic that is lower in a degree of level compression than the first gradation conversion characteristic or that causes no level compression, where M is greater than N; a dissimilarity calculating unit that receives the primary data and the secondary data and calculates dissimilarity between the primary data and the secondary data according to each position of each pixel and uses data regarding the calculated dissimilarity to output tertiary data; and a recording unit for discriminating a non-coincidence position that is a position in an image where the secondary data cannot be calculated directly from the primary data and for recording the primary data and the tertiary data at the non-coincidence position in the file, the image reproducing apparatus comprising:

a reading unit for reading the primary data and the tertiary data from the file; and a secondary data calculating unit for reproducing the secondary data based on the primary data and the tertiary data read by the reading unit, wherein said secondary data calculating unit discriminates the non-coincidence positions according to pixel values of the primary data, disposes the tertiary data at the non-coincidence positions and performs positioning between the primary data and the tertiary data, and reproduces the secondary data based on the primary data and the tertiary data that corresponds to the primary data in pixel position.

* * * * *